United States Patent [19]

Notte et al.

[11] 3,727,892
[45] Apr. 17, 1973

[54] FEEDBACK CONTROL FOR A CONTINUOUS MIXER HAVING A CONTROL OF INTERNAL PRESSURE

[75] Inventors: Angelo Joseph Notte; Peter Hold, both of Milford; Klaus Juergen Spitzner, Oxford, all of Conn.

[73] Assignee: USM Corporation, Boston, Mass.

[22] Filed: Dec. 14, 1971

[21] Appl. No.: 207,743

[52] U.S. Cl. .................................259/10, 259/191
[51] Int. Cl. ..............................................B01f 7/02
[58] Field of Search..........................259/191, 192, 9, 259/10, 25, 26, 45, 46; 425/149, 145, 143; 318/684

[56] References Cited

UNITED STATES PATENTS

| | | | |
|---|---|---|---|
| 3,154,808 | 11/1964 | Ahlefeld | 259/192 |
| 3,237,241 | 3/1966 | Gagliardi | 259/192 |
| 3,239,878 | 3/1966 | Ahlefeld | 259/192 |
| 3,371,386 | 3/1968 | Ludwig | 259/191 |

*Primary Examiner*—Robert W. Jenkins
*Attorney*—Charles B. Spencer

[57] ABSTRACT

This disclosure is directed toward an electromechanical feedback control for automatically regulating the discharge temperature in a continuous mixer. The feedback control senses both the mixer discharge temperature and the rate of change of mixer rotor torque. The torque rate of change is detected by a derivative circuit and serves to offer an anticipatory signal to the control system. The feedback control then regulates the internal pressure of the mixer in accordance with an error signal representing the difference between the measured mixer discharge temperature plus torque derivative signals and a preset desired temperature command signal.

2 Claims, 5 Drawing Figures

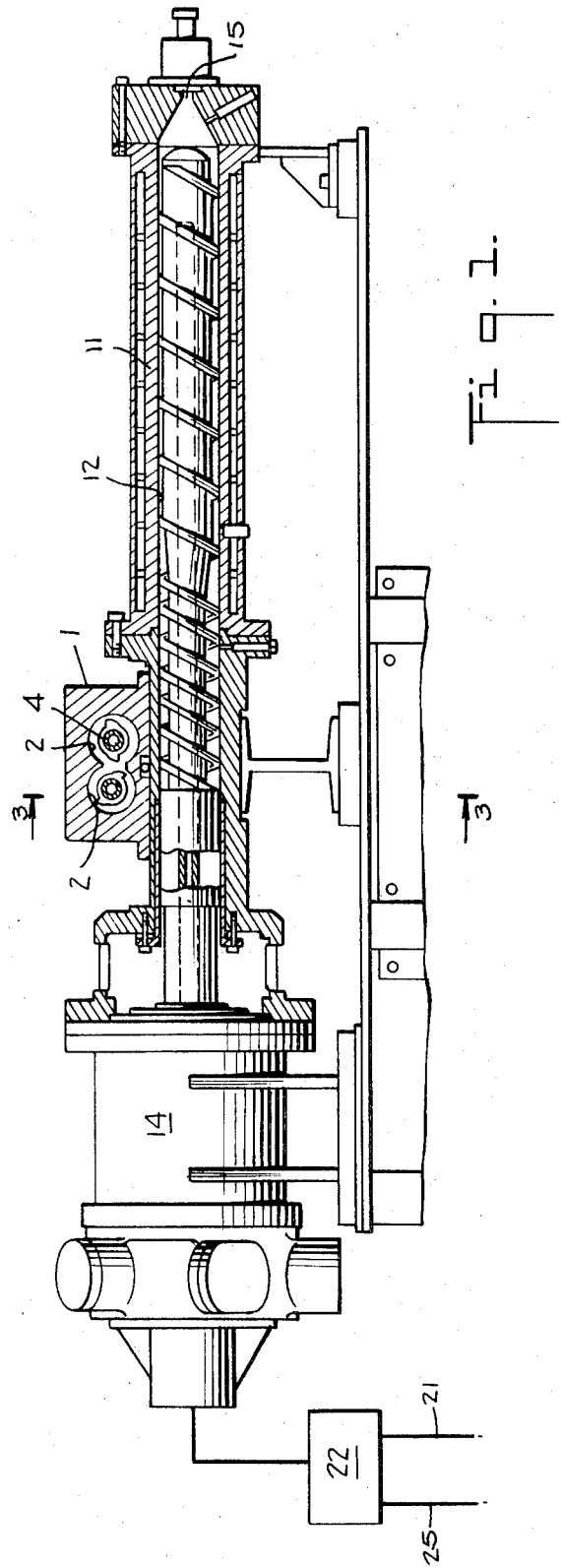
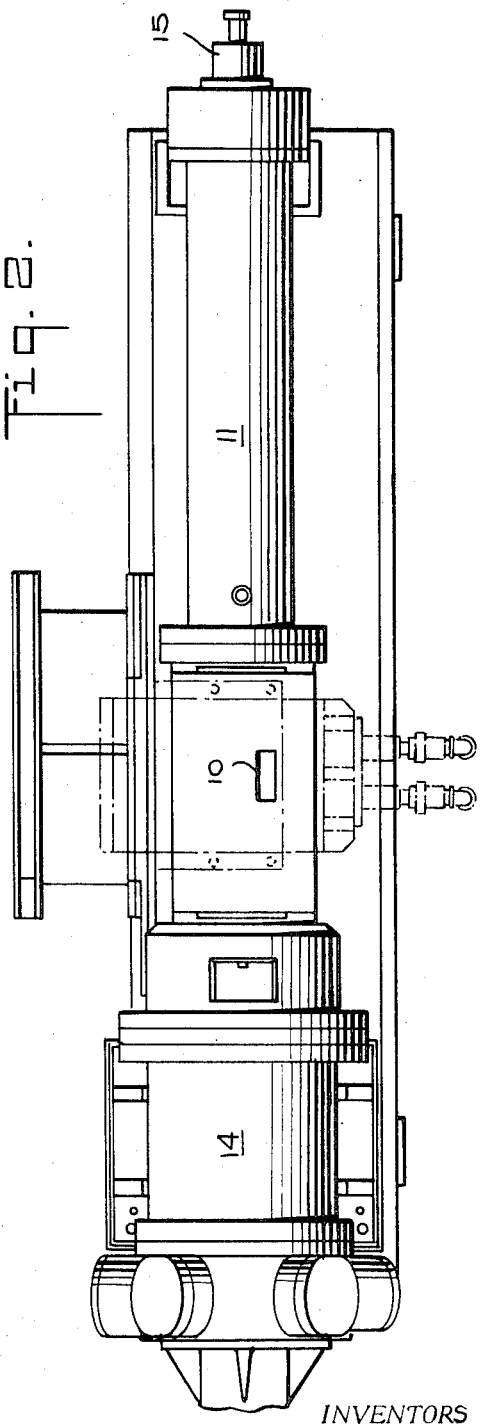
Fig. 1.
Fig. 2.
INVENTORS
PETER HOLD
ANGELO JOSEPH NOTTE
KLAUS JUERGEN SPITZNER

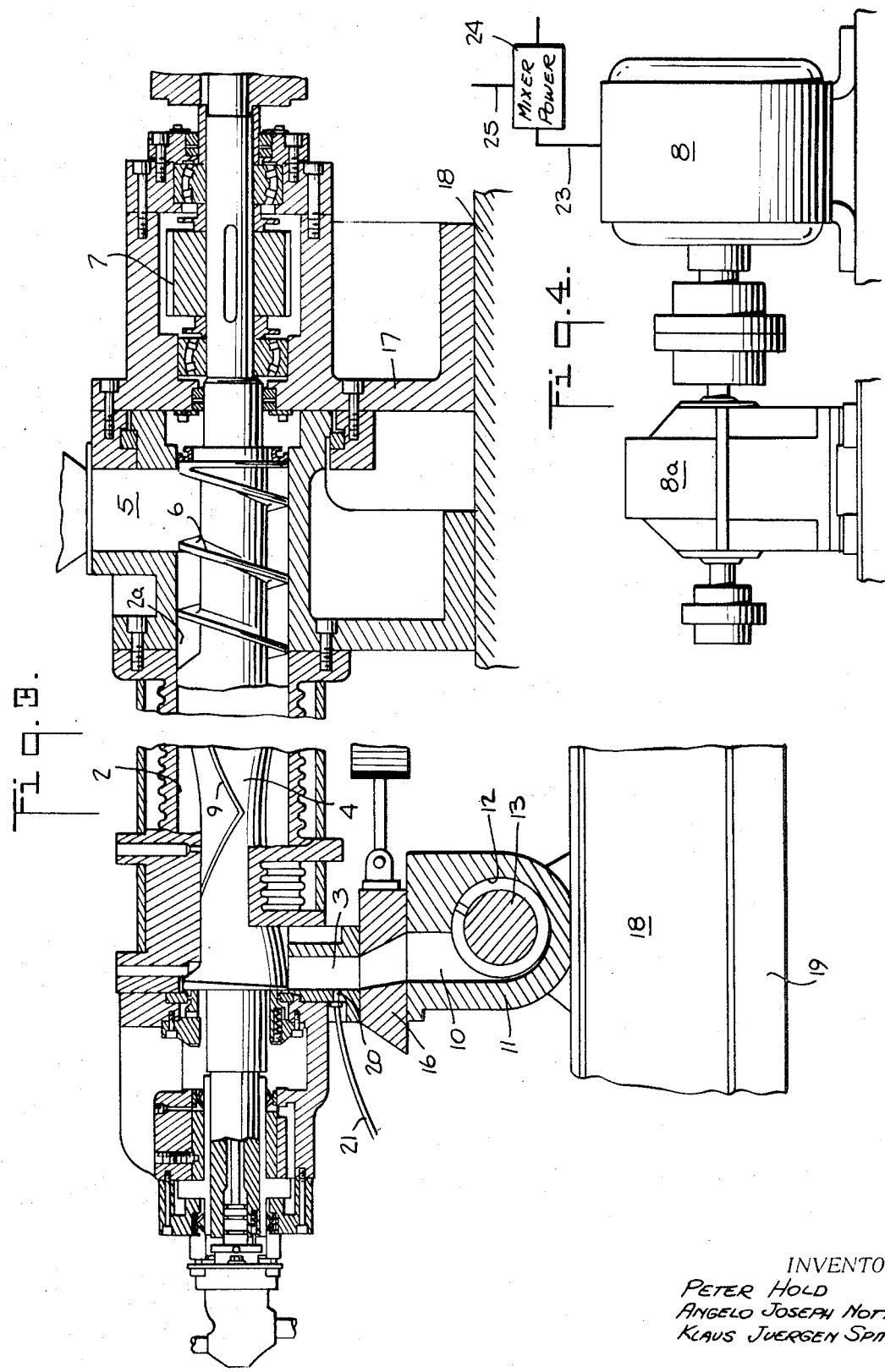

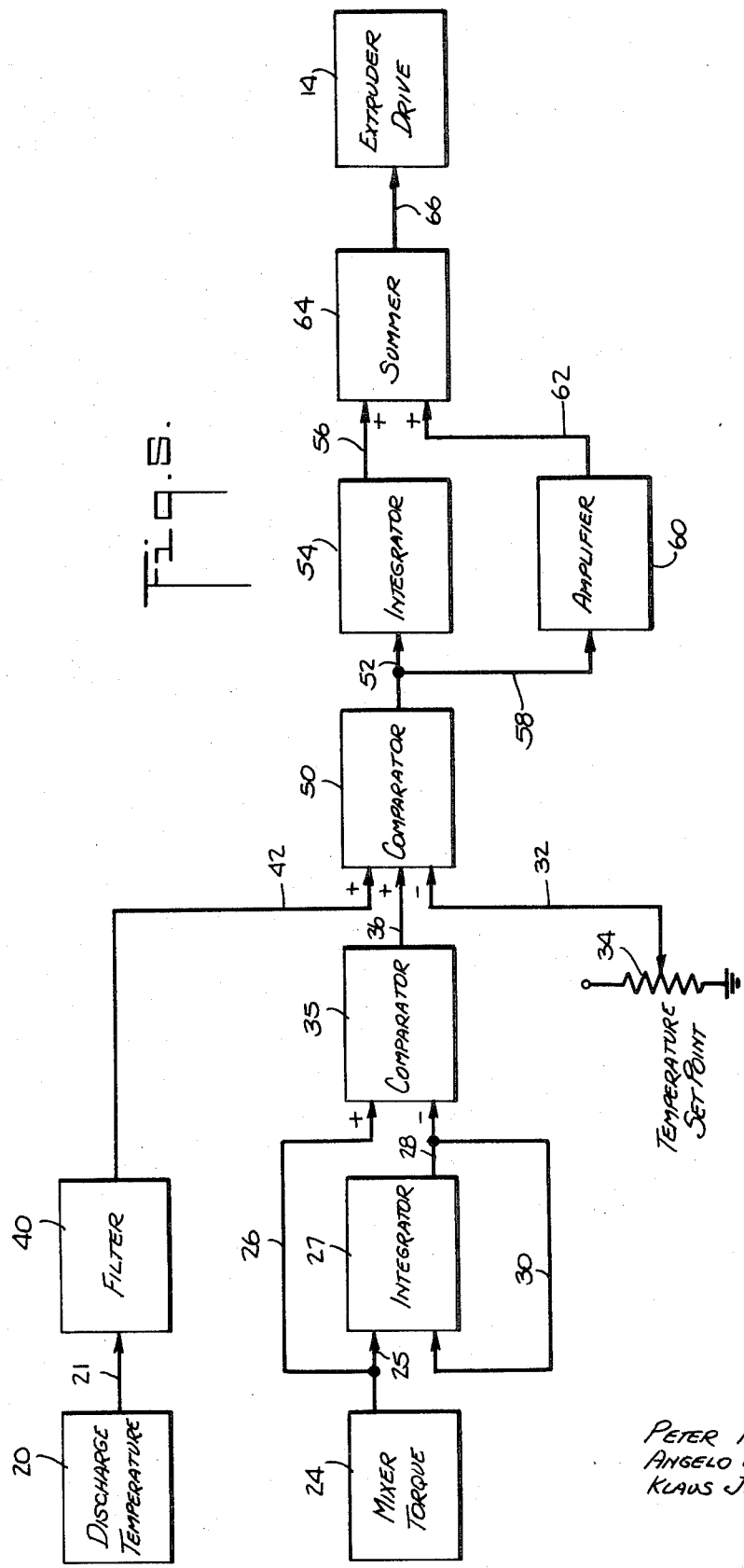

FEEDBACK CONTROL FOR A CONTINUOUS MIXER HAVING A CONTROL OF INTERNAL PRESSURE

This invention relates generally to continuous mixers such as are disclosed and claimed by the Ahlefeld Jr. et al. U.S. Pat. No. 3,154,808 dated Nov. 3, 1964. Such a continuous mixer includes a mixing enclosure having interspaced entrance and exit openings and containing mixing means which cannot alone force material through this enclosure but does permit material to be forced through this enclosure at a rate dependent on the rate at which material is forced into the entrance opening to displace or push material already in the enclosure to the exit opening and out through the latter.

Control of the internal pressure of the material being mixed in such a mixer is effected by variably restraining the discharge of mixed material displaced or forced from the mixer when unmixed material is fed into the mixer.

The control disclosed and claimed by the Ahlefeld et al. patent works on the general principle of a fluid flow choke using static surfaces over which the material flows and operates by varying the cross-sectional area of the opening through which the material is discharged. Control of such a discharge restraining means automatically in response to the temperature of the discharge material, is disclosed by the Gagliardi U.S. Pat. No. 3,237,241 dated Mar. 1, 1966. The discharge temperature is a function of the pressure on the material being mixed in the mixer.

An improvement internal pressure control provides the material discharge with one or more elements which engage the discharge flow and are movable in the direction of flow at a speed controllable to provide restraint to this flow. Examples are disclosed and claimed by the Scharer et al. patent application Ser. No. 91,351 filed Nov. 20, 1970.

In a continuous mixer such as is disclosed and claimed in the Ahlefeld patent, which utilizes either of the two aforementioned internal pressure controls, a critical process parameter is the temperature of the discharged material. This temperature is controlled by adjusting the back pressure applied to the material during discharge. The back pressure, in turn, varies the amount of mixing energy absorbed by the material from the mixer rotor. The effect of a change in the amount of mixing energy absorbed by the material (i.e. as measured by the change in power applied to the mixer rotor) is a corresponding change in the steady state temperature of the material discharged from the mixer.

In the Gagliardi Patent cited above, the back pressure of the material being mixed is controlled in response to the temperature of the discharged material by forming a direct dependence between the back pressure and the discharge temperature. HOwever, since the time constant associated with discharge temperature changes caused by variations in back pressure is several minutes, a control that uses a temperature feedback only can result in either extensive sluggishness or severe overshoots. Anticipatory networks applied to temperature, itself, would tend to improve this condition but the practical application of these networks requires the use of differentiators which are objectionable because of their noise susceptibility and large reactive components since extremely low frequencies are involved. The time constant associated with mixer rotor power or torque changes caused by variations in back pressure is, however, several orders of magnitude smaller than the time constant associated with temperature changes caused by variations in back pressure. Furthermore, there exists a relationship between this torque change and the steady state temperature of the discharge material.

The present invention uses the rate of change of mixer rotor torque as one of the feedback signals to control the discharge steady state tempetature. After transients die out, this derivative signal reduces to zero, forcing the ultimate comparison to be made between actual temperature and the setpoint. Since the system has a pure integration in its foreward loop, corrective action will occur until the comparison (error) signal drops to zero.

A specific embodiment of the present invention is disclosed below in connection with the continuous mixer using a screw extruder as an example of the improvement internal pressure control.

In the accompany drawings:

FIG. 1 is a side view of the extruder in longitudinal section and of the mixer in transverse section, both on a vertical plane, with the exception of the extruder screw driving motor which is shown in elevation;

FIG. 2 is a top view of FIG. 1;

FIG. 3 is a cross section taken on the line 3—3 in FIG. 1;

FIG. 4 schematically shows the power drive for the mixer; and

FIG. 5 schematically shows the electrical control system of the present invention.

Referring first to FIGS. 1 to 3, the continuous internal mixer is shown as comprising a barrel 1 which may have either of the external forms shown by FIGS. 1 and 3. This barrel forms two parallel, laterally interconnecting cylindrical chambers 2 having at one end a common discharge orifice 3. Bladed rotors 4 are located in the chambers 2. The material to be mixed is stuffed under pressure into the chambers 2 at an entrance location 2a spaced from the discharge orifice 3, a vertical port 5 leading to stuffing screw blades 6 formed on the rotors 4 and which push the material through entrance openings 2a of the two barrels. The rotors 4 are intergeared for opposite rotation by gears 7 and supplied with a rotary power drive system schematically shown in FIG. 4 as comprising an electric motor 8 driving through a gear reduction unit 8a. Each of the rotors 4 has a blade 9 with a cross section which is substantially like that of a Banbury-type blade and having a portion that twists away from its direction of rotation and a portion that twists in the opposite direction, the length and twist ratio between these oppositely twisting portions of each blade being such that when the chambers 2 contain the material stuffed into them the average of the axially directed forces applied to the material by the blades is insufficient to force the material through the orifice 3. In this way the overall axial travel of the material through the chambers 2 is dependent on the rate at which it is received through the port 5. Each rotor may have more than one blade, each blade has the two portions referred to, and although not shown, these portions may be displaced relative to each other circumferentially with respect to the rotor.

The exit opening or discharge orifice 3 opens transversely from the chambers 2 and at least mainly in overlapping relation with respect to the portions of the blades 9 adjacent thereto. The blades may have other contours where they overlap the orifice 3, or separate elements (not shown) may be used to stuff the mixed material through the orifice 3. With opposite rotation of the rotors so that the blades of both turn downwardly in the direction of the orifice 3, there is a force exerted on the material by the blades, or other elements if used, to stuff it through this discharge orifice. This escape of the material must be restrained in a controllable manner for the pressure on the material being mixed in the chambers 2 to be produced and controlled.

As shown by FIGS. 1 and 3 in particular, the discharge orifice 3 is connected directly and positively to the inlet 10 of a screw-type extruder having a barrel 11 forming a cylindrical chamber 12 in which a screw 13 is rotatively positioned. This screw is connected to a variable speed rotary motor or extruder drive 14 by means of which the rotative speed of this screw may be positively controlled. The chamber 12 has an outlet or extrusion orifice 15.

The motor 14 may be of the hydraulically operated type such as one of those commercially available from Houdaille Industries, Inc., Buffalo Hydraulics Division. However, any motor may be used providing adequate torque and which can be controlled as to its speed and which can drive the screw 13 at a selected constant rotary speed.

Adjacent to the extruder's inlet 10 and the mixer's discharge orifice 3 under operation the pressure in the extruder's chamber 12 is a back pressure, or in other words, a negative pressure with respect to the force on the material extruded through the outlet or extrusion orifice 15. Somewheres between that location and the orifice 15 the pressure on the material becomes positive with respect to the extruder's discharge orifice, or in other words, the screw will exert a forwardly direct force on the material.

When the patented continuous mixer is started up from its shutdown condition, it is preferably to close its discharge orifice 3 completely until the material charged has reached a plasticized condition and substantially stable operation is obtained. Therefore, as shown particularly by FIG. 3, a shutoff valve 16 of the sliding type is interposed between the discharge orifice 3 and the extruder's inlet 10. This valve is closed when starting up the mixer but is thereafter opened and not used to restrain or choke the discharge of the mixed material. When the mixer is in operation, the valve is open and it is the screw-type extruder that provides the restraint to the discharge material.

As shown by FIG. 3, the continuous mixer is rigidly supported by a base 17 resting on a solid foundation 18, with its barrel 1 and any parts connected to it projected from this base in cantilever fashion. In this FIG. 3 the screw-type extruder has its barrel 11 supported immovably by supports which are fastened to an immovable base member 19. The extruder is positioned transversely with respect to the mixer.

In the operation of the form of continuous mixer shown in FIGS. 1 to 3, material discharged through the discharge orifice 3 of the continuous mixer is engaged by a moving surface or surfaces in the form of the blade or blades of the screw of the screw-type extruder. If the screw is not rotating, the pressure on the material in the discharge orifice 3 is insufficient to drive the material through the spiral course or courses of the screw's blade or blades. As the material is continuously charged into the mixer, the pressure on the material inside of the mixer increases and when this has the desired value the screw should be rotated at a rate just sufficient to match the rate at which the mixer is fed.

During operation a slowdown of the screw serves to increase the mixer's internal pressure, after which the screw can be returned to the rate matching the mixer's charging rate. A speedup of the screw drops the pressure in the mixer. In all instances the material should be discharged from the mixer at substantially the rate at which the mixer is charged with material to be mixed, regardless of the selected mixer internal pressure.

Automatic control of the screw-type extruder is possible. Thus, FIG. 3 shows a temperature sensing element 20, such as a thermocouple, connected by wiring 21 to a control system or control 22 for the motor 14 as shown in FIG. 1. The control 22 may be as shown by the previously mentioned Gagliardi U.S. Pat. No. 3,237,241, but modified to operate the usual speed controller of the hydraulic motor 14.

The present invention is an improvement of the above control and is shown in diagrammatic form in FIG. 5. The control 22 of the present invention controls the extruder drive motor 14 not only in response to the discharge temperature measured by discharge temperature transducer 20 and conveyed to the control 22 on wire 21 but also in response to the torque of the mixer rotor 4 measured on the rotor torque transducer wire 23 by a mixer rotor torque transducer 24 and conveyed on wire 25 to control 22 of FIG. 5, as schematically shown by FIG. 4.

Referring to this schematic diagram of FIG. 5, a reference command signal is derived on wire 32 from a temperature set point potentiometer 34. The temperature set point potentiometer 34 is set to produce a signal on wire 32 which is proportional to a pre-determined temperature which is desired for the discharge material. A signal proportional to the measured mixer rotor torque of the continuous mixer is derived on wire 25 from the torque transducer 24.

The mixer rotor torque signal is led on wire 25 to integrator 27, and on wire 26 to comparator 35. The integrator 27 output signal is fed back on wire 30 to the input of the integrator 27 and is also led by a wire 28 to comparator 35. The combination of integrator 27 and comparator 35 forms a compensating network which takes the derivative of the low frequency portion of the mixer torque signal and attenuates the high frequency portion. The output of comparator 35 has therefore a magnitude only during transients. In the steady state (i.e. when the mixer torque is not changing) the output of comparator 35 is zero.

The discharge temperature transducer 20 measures the discharge temperature of the material being discharged from the continuous mixer and generates a signal on wire 21 which is directly proportional to the measured discharge temperature. The temperature set point potentiometer 34 is calibrated such that its output signal on wire 32 will be identical to that produced at the discharge temperature transducer output on wire 21 if the temperature measured by the discharge temperature transducer 20 matches the desired temperature set at the temperature set point potentiometer 34.

The discharge temperature on wire 21 is led to a noise filter 40. The output of this filter is led on wire 42 to comparator 50. The other two inputs of comparator 50 are the temperature set point on wire 32 and the compensated mixer torque signal on wire 36. Comparator 50 output is led on wire 52 to integrator 54, and on wire 58 to amplifier 60. Summer 64 then combines the wire 56 signal from integrator 54 with the wire 62 signal from amplifier 60. The resulting speed command signal is led on wire 66 to the extruder drive 14. Because of the integrator 54, the error signal on wire 52 will be integrated in such a fashion as to alter the speed command signal on wire 66 to the extruder drive 14 such that the error signal is reduced to zero. Since, in the steady state, the compensated mixer torque signal on wire 36 is zero, the mixer discharge temperature on wire 42 is forced to equal the temperature setpoint on wire 32. There is therefore no temperature error in the steady state.

A step command change in discharge temperature can result in a new extruder steady state speed that is higher, lower, or equal to the speed before the change was introduced. The rate of change of speed during the transient state, however, is positively correlated with the mixer torque derivative

What is claimed is:

1. Apparatus for controlling the temperature of the discharge material in a continuous mixer having a mixer rotor for mixing material and having a control of the pressure on the material within said mixer comprising:

means for measuring the discharge temperature of the material to be mixed and producing a signal representing said discharge temperature;

means for measuring the mixer rotor torque and producing a signal representing said torque;

an electrical control circuit adapted to receive the discharge temperature signal from the discharge temperature measuring means and adapted to receive the mixer torque signal from the mixer torque measuring means and to affect the mixer torque signal in such a way as to produce the filtered derivative of the mixer torque;

means for producing a signal representing a predetermined desired temperature of the discharge material;

means for activating the pressure control of said mixer in response to a signal representing the difference between the desired discharge temperature signal and the actual measured discharge temperature.

2. A continuous mixer comprising a mixing enclosure having interspaced entrance and exit openings, mixing means contained in said enclosure and which cannot drive material through this enclosure but does permit material to be pushed through this enclosure while being mixed, means for pushing material through said entrance opening into said enclosure and means for restraining the movement of material from said enclosures through said exit opening; wherein the improvement comprises said restraining means including one or more surfaces contacted by the material moving from said enclosure and which move in the direction of the movement of this material and means for controlling the movement of said surface or surfaces to control the restraint on said material and temperature sensing means located to measure the temperature of the heat created in said material by said mixing means, and means for measuring the power contributed by said mixing means to said material and means automatically responsive to said temperature sensing means and said mixer power measuring means for controlling said means controlling the movement of said surface or surfaces to control the restraint on said material.

* * * * *